J. PERKINS.
Driving Mechanism of Sewing Machines.
No. 27,926. Patented April 17, 1860.
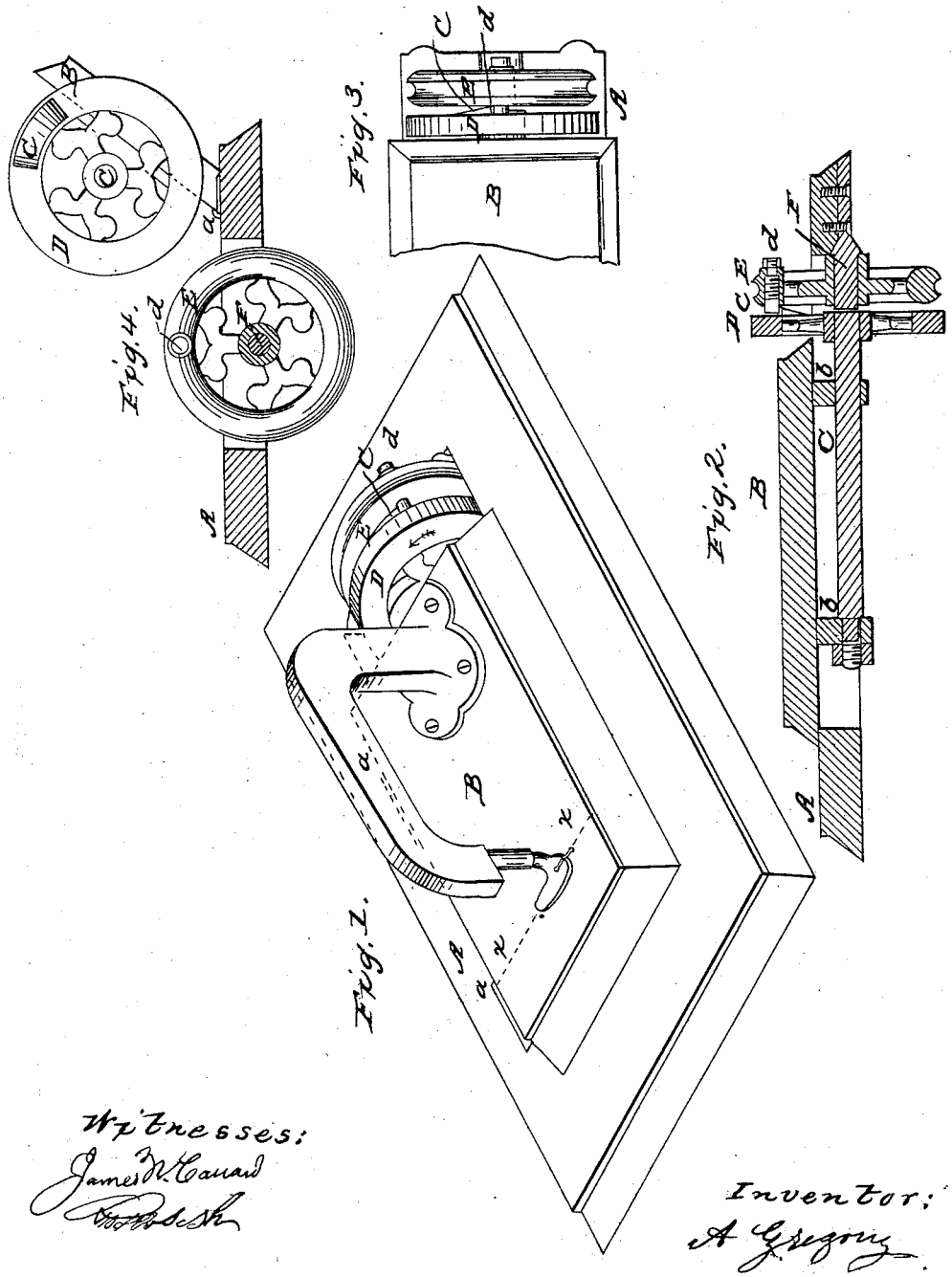
Witnesses:
James M. Canard
Inventor:
A. Gregory

UNITED STATES PATENT OFFICE.

JONAS PERKINS, OF BRAINTREE, MASSACHUSETTS, ASSIGNOR TO N. S. C. PERKINS, OF NORWALK, OHIO.

IMPROVEMENT IN DRIVING-MECHANISMS FOR SEWING-MACHINES.

Specification forming part of Letters Patent No. 27,926, dated April 17, 1860.

*To all whom it may concern:*

Be it known that I, JONAS PERKINS, of Braintree, in the county of Norfolk and State of Massachusetts, make known that I have invented a certain new and useful Improvement on the Driving Mechanisms of Sewing-Machines; and I do hereby declare that the following is a sufficiently full and clear description thereof as and when taken in connection with the accompanying drawings, which form part of this specification, to enable others practically acquainted with constructing and operating sewing-machines to make and use the same.

This my invention or improvement is not restricted to any one particular class or character of sewing-machines, but is applicable to many or most, if not all, descriptions thereof, and admits of being so constructed and applied as to embrace in its action or provision at least two important uses. These latter will be best explained by referring, preliminarily, to certain peculiarities of sewing-machines generally, and to some of the means that have heretofore been devised for overcoming obstacles incidental to them.

It is a common requirement with many or most of the sewing-machines now in use that they operate or be driven in only one direction. If, by a careless move of the operator, or experimental one of an inexperienced person, or willful act of a mischievous individual, the machine be driven in a wrong or backwardly direction, there is great risk of breaking the needle, thread, or stitch, or of otherwise producing injury and derangement of the work. Many contrivances have been proposed for obviating this liability of the machine, or its work, to injury. Thus, ratchet-wheels and pawls, or their equivalents, have been connected with the driving-shaft of the machine in such a manner as to admit of said shaft only moving in one direction, though an effort be made to turn it in a contrary course. Such a method of producing the desired result has been variously applied. It has been made to include a starting arrangement to the driving-shaft when the latter has been operated by a crank or cranks, and has admitted of the knee of the operator controlling the action of the same, so as to leave his hands at liberty for the guidance of the work. In other instances of its application other facilities have been afforded; but all such applications of the same method, whether automatic in their action or otherwise, are open to many and serious objections, among which may be mentioned the dead-lock and strain which is produced in attempting to drive the machine backward, and which is very liable to produce injury or breakage. Other arrangements or methods have made it immaterial which way the power-shaft was driven, as, by the intervention of a rocking beam or its equivalent and other attachments, the driving-shaft proper of the needle and feeding mechanism was made, of necessity, to move in the right direction; but such and other like previous arrangements do not admit of a free movement backward, by hand, of the machine independently of its driving mechanism, when a back movement is desired for purposes of adjustment or otherwise; and, besides, they involve much complication, friction, and an objectionable indirect driving action generally. Other previous modes or means for meeting the obstacle or peculiarity which has been explained it would here be superfluous to refer to.

The remaining peculiarity in sewing-machines generally, to which I have now to allude, in connection with my present improvement, consists in the necessary arrangement of much of the mechanism, including not only the hook or looper, but frequently the cloth-feeding devices, and, where the machine is a double-thread one, secondary spool or shuttle, or its equivalent, under the bed or surface on which the cloth rests or moves; and the difficulty which is sometimes experienced in getting at and consequently handling or seeing such under works, to facilitate adjustment and cleaning or repairing of said parts. The table or bed of the machine has been variously constructed to meet such difficulty. It has been made in parts or fitted with slides that, on removal, expose the under works, and it has been hinged, in part or in whole, so as to admit of a more perfect exposure upon the machine being thrown up or back, and whereby a full inspection and control of the under works and from their under side is obtainable. Many of these modes of construction, however, are objectionable, especially when the machine is driven by a belt or band, as they interfere with the driving contrivances, or the latter with them, and cause loss of time and produce trouble in the slipping off and on of the belt each time the machine is lifted to open and close again. To remove this latter objection, machines having their cloth-beds hinged at the back have been driven by frictional contact of one pulley with another, by incasing the periphery of one of the pulleys with a soft and rough material, such as leather. This is an old mode of communicating power in light machinery of various kinds, and the objections to it for other than very light work and for much of the latter, are so well understood by mechanics that I shall not touch upon them here.

My present invention admits of the ordinary belt or band system of driving being adopted, and said invention is calculated to facilitate the exposure of the under works of the machine when the cloth-bed, in part or in whole, or the machine is hinged to its stand, or otherwise suitably seated on or connected with the stand to admit of a like exposure of the devices on the under side of the bed, by its not requiring the band to be slipped off or shifted, or its travel interfered with, when opening the machine, as specified. Such, and preventing the machine from being improperly driven backward, and this without producing a dead lock or strain on attempting to drive it back, are the principal objects of my invention.

In the accompanying drawings, Figure 1 represents a view in perspective of a cloth-bed to a sewing-machine, with surrounding table-top or stand, and certain mechanical devices for giving motion to and controlling the action of the shaft from which the needle and feeding movements and that or those of the shuttle or looper are or may be derived. Fig. 2 represents a longitudinal vertical section taken through said shaft; Fig. 3, a plan view in part; and Fig. 4, a vertical section taken at right angles to Fig. 2, and showing the cloth-bed thrown up or back.

The portion marked A represents the table-top on which the machine is placed or to which it may be joined, by hinges $a\ a$, connecting the cloth-bed B therewith.

C is the works-operating shaft of the machine, arranged below the cloth-bed and working in suitable bearings, $b\ b$, attached thereto. This shaft is made to carry at its one end a disk, arm, or wheel, D, provided, say, on its outer side or face with one or more inclined plane formations, $c$, that is or are made and set to permit of a spring-held stud, $d$, or studs, if more than one, to act as a driver to the wheel D, when said stud is rotated in one direction, and caused to meet the abrupt edge or back of the inclined plane $c$, but which slips or rides freely over the inclined plane to avoid driving the wheel D, when said stud is rotated in the opposite direction, and so as first to meet the inclined plane at its front.

The spring-stud $d$ may be carried by a disk, arm, or wheel, E, fastly hung to turn with or freely rotating on a shaft or pin, F, which is preferably arranged coincident with the machine-shaft C, when the latter is in its working position, but which is distinct from it and connected with the table top or stand A, or otherwise equivalently supported, so as to make such loose wheel-shaft F independent of the opening and closing cloth-bed B or piece carrying the machine-shaft C. This independent shaft F or loose wheel E may be driven, either directly or indirectly, by any suitable power and in any suitable manner so as to rotate the driving spring-stud $d$; but I here show the stud as arranged to be carried in a direct manner by the loose wheel or pulley E, and the latter as grooved on its periphery, so as to form a band-pulley, to which motion may be communicated from a wheel operated by treadle or otherwise in the usual manner of banded gearing.

From this description and inspection of the drawings it will readily be seen that, by a proper set of the inclined plane $c$ on the machine-wheel D, motion only can be communicated to the machine-shaft C by the stud $d$ acting on the inclined plane in one and the right direction, and that the travel of the stud and its driving-wheel in the opposite direction will fail to turn the machine-shaft, the spring-stud $d$ riding freely over the inclined plane when the band-wheel E is driven backward; and it will further be seen that there is no dead-lock or stop to strain on the machine when the band-wheel E is driven backward, and that a backward motion may be communicated to said wheel indefinitely without actuating the machine; also, that when the band-wheel E is driven to actuate the machine in a forwardly direction, the driving-force on the machine-shaft is a positive one, and that there is no necessity on part of the operator to shift or gear or ungear parts or devices to secure the machine-shaft being driven in the right direction only, but that the provision in this respect is or may be automatic; and it will further be seen that the machine, with its cloth-bed B, or other portion carrying the works-operating shaft C, may be thrown up and back or to one side, if hinged as represented in Figs. 1 and 4; or, if not hinged, be slid to one side, or be raised clear from the stand during the operation, if desired, and so as to freely expose the under works without requiring the operator to unship the driving-band, or otherwise subjecting him to trouble and loss of time, either in making or breaking the connection of the machine-wheel D, when down, with the band-wheel E, and whereby facility is afforded for working the machine without operating the driving mechanism to effect adjustment of parts when the cloth-bed is raised.

I need scarcely observe that I do not restrict my invention to any precise construction or arrangement of parts, as an experienced mechanic may easily effect changes in these respects without violating the principle of action set forth in this my improvement. Thus, the spring-held driving-stud or its equivalent may be in connection with the machine shaft-wheel, and the inclined plane be reversed and arranged in connection with the loose band-wheel; or, both wheels may be furnished with inclined-plane projections set in reverse directions, and the one wheel caused to press inward toward the other by means of a weight or spring. Either of such arrangements would constitute, in effect, a like provision to that which I have before described, of self locking and unlocking clutches or wheels jointly operative, the one as a driver to the other, in one direction only, and the driven clutch being connected with the opening and closing portion of the machine.

In the construction and arrangement of parts shown in the accompanying drawings, the feed of the cloth over the bed is supposed to be in a transverse line or direction (as indicated by dotted red line $x\,x$) to that of the machine-shaft, and the machine to be so placed on the table as that the clutches or wheels actuating said shaft are in the rear of the goose-neck or standard of the machine, and accordingly out of the way of interference with the cloth; but when the operating-shaft $c$ is designed to lie parallel with the feed of the cloth, then it may be desirable to reduce the diameters of the clutch-wheels, or to lower them, so as not to project above the cloth bed or table, to prevent them catching on or being caught by the cloth.

In those machines in which the driving-gear is arranged above the cloth-bed and table-top then the two shafts C and F, with their wheels or clutches D and E, may be connected by suitable standards, the one with the opening and closing cloth-bed, and the other with the table or table-top from above, instead of below.

Having thus described my improvement, I claim as new—

The method, substantially as herein described, of communicating power to sewing-machines by means of self locking and unlocking clutches or wheels, arranged the one to drive the other in one direction only, when said clutches are hung for independent and joint rotation on separate shafts or distinct axial bearings, the one of which is attached to a lifting or opening and closing portion of the machine and the other disconnected therefrom, for the double purpose of preventing the machine from being improperly driven backward and to facilitate exposure of the under works, also whereby the machine, when driven by a band or belt, may be opened without unshipping the band.

In testimony whereof I have hereunto subscribed my name.

JONAS PERKINS.

Witnesses:
ANN J. WILD,
MARY E. PERKINS.